(12) United States Patent
Kikuchi et al.

(10) Patent No.: US 9,227,560 B2
(45) Date of Patent: Jan. 5, 2016

(54) VEHICLE OPERATING DEVICE

(71) Applicant: ALPS ELECTRIC CO., LTD., Tokyo (JP)

(72) Inventors: Tsuyoshi Kikuchi, Miyagi-ken (JP); Yu Masuya, Miyagi-ken (JP); Nobuyuki Tanabe, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 41 days.

(21) Appl. No.: 14/328,315

(22) Filed: Jul. 10, 2014

(65) Prior Publication Data
US 2015/0033900 A1    Feb. 5, 2015

(30) Foreign Application Priority Data
Jul. 31, 2013   (JP) .................. 2013-158585

(51) Int. Cl.
| B60Q 1/34 | (2006.01) |
| B60Q 1/42 | (2006.01) |
| G05G 5/05 | (2006.01) |
| G05G 5/06 | (2006.01) |
| G05G 1/04 | (2006.01) |

(52) U.S. Cl.
CPC ........ B60Q 1/425 (2013.01); G05G 5/05 (2013.01); G05G 5/06 (2013.01); G05G 1/04 (2013.01); Y10T 74/20396 (2015.01)

(58) Field of Classification Search
CPC .................................. B60Q 1/34; H01H 3/16
USPC .................... 200/61.27, 61.3, 61.54; 74/491
See application file for complete search history.

(56) References Cited

FOREIGN PATENT DOCUMENTS
JP         2012-195103 A    10/2012

Primary Examiner — Edwin A. Leon
Assistant Examiner — Iman Malakooti
(74) Attorney, Agent, or Firm — Brinks Gilson & Lione

(57) ABSTRACT

A cancelling drive member includes a biasing cam portion having a first biasing contact portion and a second biasing contact portion formed therein. A deflectable spring member that biases the cancelling drive member forward is provided. If the cancelling drive member rotates, an elastic pressure portion of the deflectable spring member is brought into contact with the first biasing contact portion. Thus, a forward biasing force and a returning force for rotation are effectively given from the deflectable spring member to the cancelling drive member.

6 Claims, 9 Drawing Sheets

VEHICLE OPERATING DEVICE

CLAIM OF PRIORITY

This application claims benefit of priority to Japanese Patent Application No. 2013-158585 filed on Jul. 31, 2013, which is hereby incorporated by reference.

BACKGROUND

1. Field of the Disclosure

The present disclosure relates to a vehicle operating device for operating a turn signal switch or the like by rotating a control lever.

2. Description of the Related Art

Japanese Unexamined Patent Application Publication No. 2012-195103 describes a turn signal switch device.

The turn signal switch device includes a holding member integrated with a control lever. The holding member is rotatably supported by a housing. The housing includes a cam member. A drive pin protruding from the base portion of the control lever is in pressure contact with the cam member. The cam member has a shape so that the control lever is urged toward an original neutral position. In addition, when the control lever is rotated from the neutral position to either side and is set to an operating position, the control lever is temporarily fixed.

The housing has a cancel lever provided thereon. The cancel lever is urged in a direction in which the cancel lever protrudes from the housing by a helical compression spring disposed below the holding member.

If, while the vehicle is being driven, the control lever is rotated to one of the two operating positions and is temporarily fixed, the cancel lever is moved in the protruding direction by a pressing force of the helical compression spring. Thus, a protrusion portion integrated with the cancel lever protrudes from the housing. If a steering wheel is rotated in a turning direction and, thereafter, is rotated in an opposite direction (toward the original position), a cancel protrusion that rotates together with the steering wheel is brought into contact with the protrusion portion and, thus, the cancel lever is rotated. The rotational force of the cancel lever provides the control lever with a returning force to the neutral position. The control lever that is temporarily fixed at the operating position is released by the returning force. Thus, the control lever returns to the neutral position.

In contrast, when the control lever that is moved to the operating position and is restrained by the hand of a user and if the cancel lever receives a rotational force from a cancel protrusion that rotates together with the steering, a drive member provided on the holding member retreats against the force of a spring. In this manner, an excessive force is not exerted on, for example, the cancel lever.

In the turn signal switch device described in Japanese Unexamined Patent Application Publication No. 2012-195103, the cancel lever is urged by the force of the helical compression spring in the protruding direction. The helical compression spring is disposed in a space above the cancel lever and below the control lever. Since the space in which the helical compression spring is disposed is required, a large height of a mechanism is required and, thus, it is difficult to make the turn signal switch device low-profile.

The helical compression spring exerts a pressing force on the cancel lever in the protruding direction, and the helical compression spring exerts, on the cancel lever that is rotated, a returning force to the neutral position in the rotational direction. At that time, since the rotational pressing force exerted on the cancel lever by the helical compression spring is week, the compression spring needs to have a spring constant higher than necessary in order to ensure the rotational returning force. As a result, the drive load occurring when the cancel lever is retreated becomes excessive.

In the turn signal switch device described in Japanese Unexamined Patent Application Publication No. 2012-195103, the cancel lever is disposed in front of the holding member that rotates together with the control lever. Accordingly, a large space for disposing the cancel lever and its operation space is needed between the cancel protrusion of the steering and the cancel lever and, thus, it is difficult to reduce the size of the turn signal switch device.

SUMMARY

A vehicle operating device includes a control lever configured to rotate from a neutral position to an operating position, a rotation member configured to rotate together with the control lever, a return biasing mechanism configured to generate a biasing force to return the control lever to the neutral position, a temporary fixing mechanism configured to temporarily fix the control lever that is rotated to the operating position, a cancelling drive member configured to be movably led by a fixing side guide between a retreat position and a protruding position and rotate when moving to the protruding position and receiving a cancelling force from the outside, a deflectable spring member that has a fixed base portion and that extends in a plane that is perpendicular to a rotation shaft of the rotation member, where the deflectable spring member urges the cancelling drive member toward the protruding position, an advance/retreat control cam provided in one of the rotation member and the cancelling drive member, where the advance/retreat control cam moves the cancelling drive member to the retreat position when the control lever is located at the neutral position and moves the cancelling drive member to the protruding position when the control lever rotates to the operating position, an intermediate member configured to receive a rotational force generated when the cancelling drive member that has received the canceling force rotates, a transfer guide unit provided between the intermediate member and the rotation member, where the transfer guide unit transfers the rotational force exerted on the intermediate member by the cancelling drive member to the control lever and moves the rotation member relative to the intermediate member when a rotational force is exerted on the intermediate member by the cancelling drive member with the control lever restrained, and an elastic member provided between the intermediate member and the rotation member, where the elastic member urges the intermediate member toward an initial position at which the rotational force is capable of being transferred to the rotation member.

DESCRIPTION OF THE EXEMPLARY EMBODIMENTS

A vehicle operating device according to an exemplary embodiment of the present invention is provided on the side of a steering shaft. The vehicle operating device is used to activate a turn signal.

Figure 1:
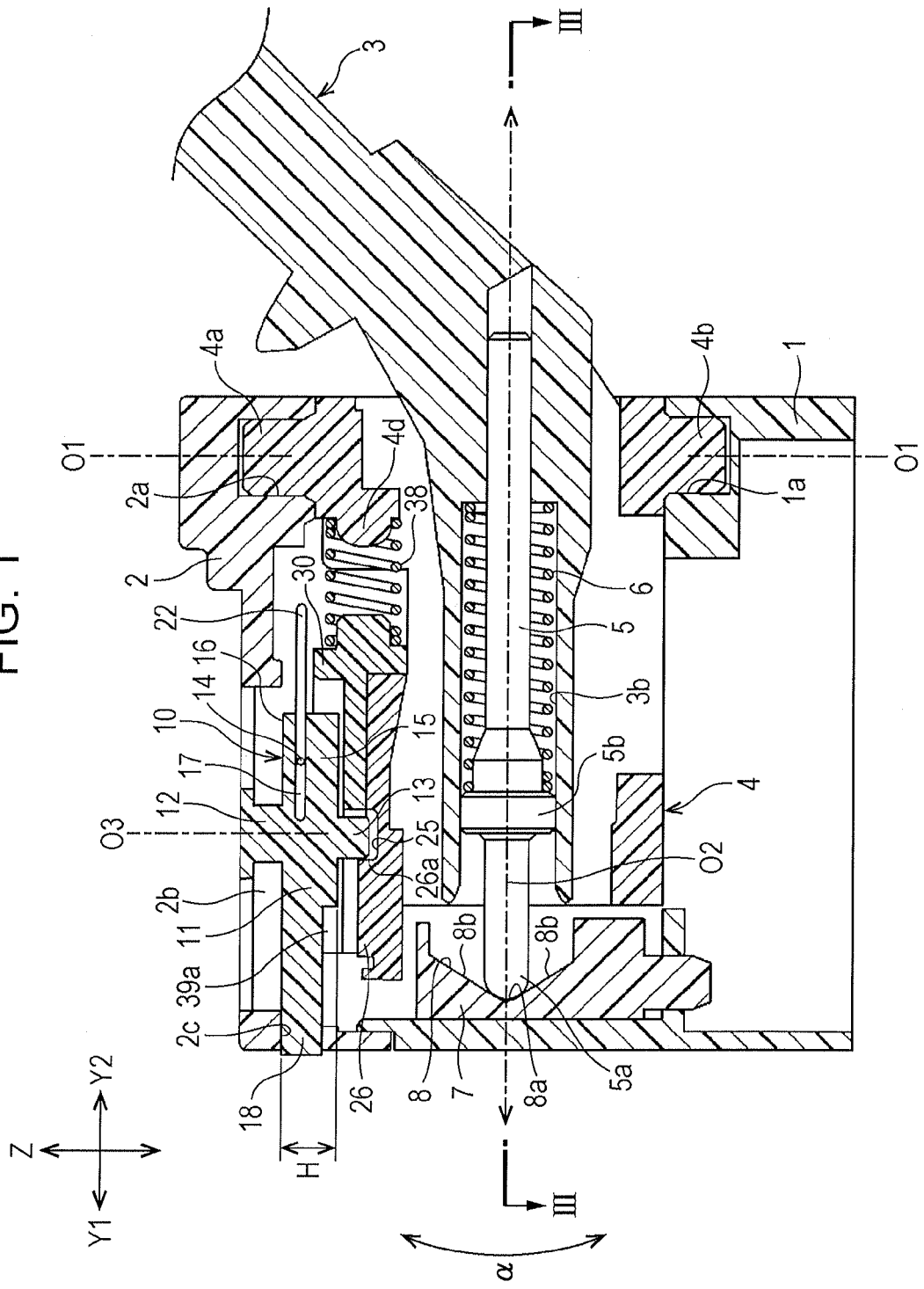
FIG. 1 is a longitudinal cross-sectional view of a vehicle operating device according to an embodiment of the present invention.
Figure 2:
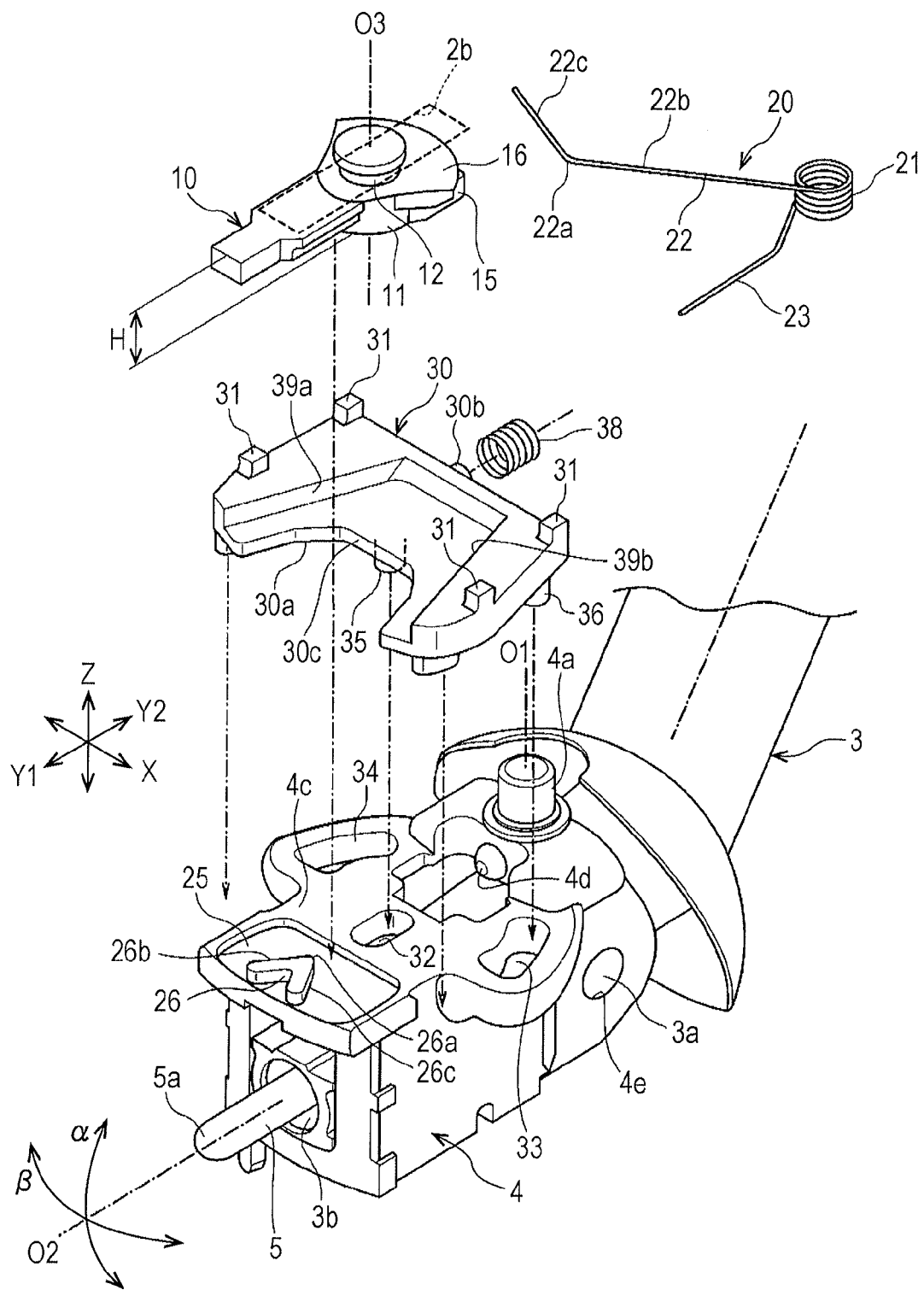
FIG. 2 is an exploded perspective view of main parts of the vehicle operating device.
Figure 3:
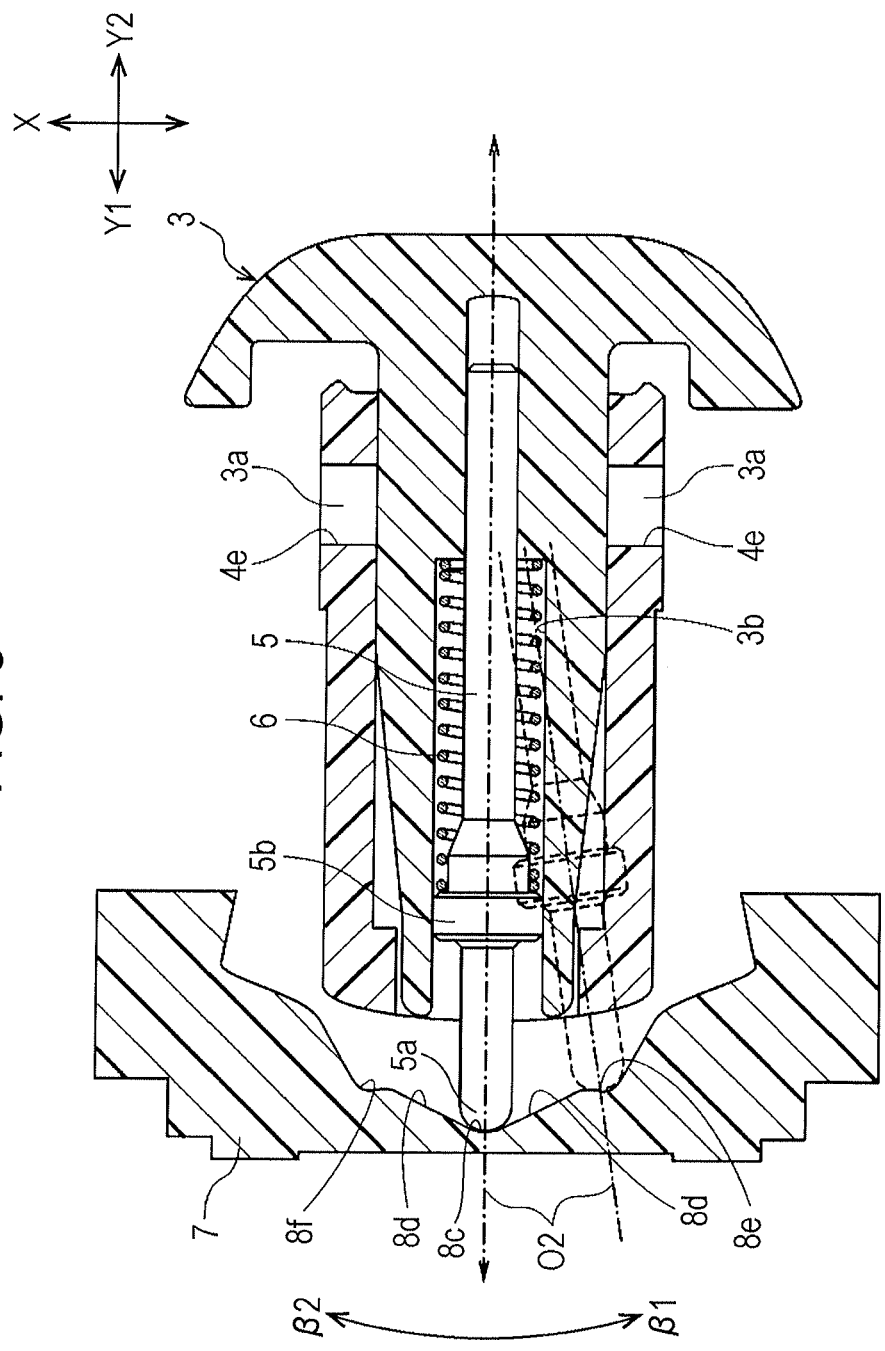
FIG. 3 is a cross-sectional view taken along a line III-III of FIG. 1.

As illustrated in FIG. 1, the vehicle operating device includes a lower chassis 1 and a upper chassis 2 serving as fixed portions. As illustrated in FIGS. 2 and 3, a rotation member 4 is attached to a base portion of a control lever 3. The base portion of the control lever 3 has a connection shaft 3a integrally formed therein. The connection shafts 3a protrude from either side of the base portion of the control lever 3 in an X direction. The rotation member 4 has a connection hole 4e that passes therethrough in the X direction. The connection shafts 3a are inserted into the connection hole 4e. As illustrated in FIG. 2, the control lever 3 is slightly rotatable with respect to the rotation member 4 in an $\alpha$ direction (a rotational direction about an X axis). In contrast, since the control lever 3 is integrally connected to the rotation member 4, the control lever 3 cannot rotate relative to the rotation member 4 in a $\beta$ direction (a rotational direction about a Z axis).

As illustrated in FIGS. 1 and 2, the rotation member 4 has an upper support shaft 4a protruding upward and an a lower support shaft 4b protruding downward in an integrated manner. The center line of the upper support shaft 4a and the center line of the lower support shaft 4b coincide with a rotation axis O1 that extends in the vertical direction (a Z direction). The lower chassis 1 has a lower bearing portion 1a formed therein, and the upper chassis 2 has an upper bearing portion 2a formed therein. The lower support shaft 4b is rotatably supported by the lower bearing portion 1a, and the upper support shaft 4a is rotatably supported by the upper bearing portion 2a. As a result, the control lever 3 and the rotation member 4 can rotate about the rotation axis O1 in the $\beta$ direction together.

As illustrated in FIGS. 1 and 3, the base portion of the control lever 3 has a holding hole 3b formed therein. The holding hole 3b contains a return pin 5. A top end sliding portion 5a of the return pin 5 protrudes forward (in a Y1 direction) from the inside of the holding hole 3b of the control lever 3. The return pin 5 has a flange portion 5b integrated therewith. In addition, the return pin 5 has a return spring 6, which is a helical compression spring, mounted on the outer peripheral surface thereof. The return spring 6 is compressed between a bottom portion of the holding hole 3b at the rear (in a Y2 direction) and the flange portion 5b. The return pin 5 is urged forward (in the Y1 direction) by the return spring 6.

As illustrated in FIGS. 1 and 3, a rotation reference line O2 of the control lever 3 is defined as a line passing through the center axis of the return pin 5.

As illustrated in FIGS. 1 and 3, a return cam member 7 is fixed to the front inner side of the lower chassis 1. The return pin 5 is urged against a cam surface 8 of the return cam member 7. The return pin 5, the return spring 6, and the return cam member 7 together form a return biasing mechanism and a temporary fixing mechanism.

As illustrated in FIG. 1, the shape of the cam surface 8 obtained by cutting the return cam member 7 by a plane parallel to a Y-Z plane includes a return reference portion 8a and return inclined portions 8b and 8b formed on either side of the return reference portion 8a in the $\alpha$ direction. When the control lever 3 rotates about the connection shaft 3a in the $\alpha$ direction, the top end sliding portion 5a of the return pin 5 runs on one of the return inclined portions 8b and 8b. Accordingly, the top end sliding portion 5a returns to the return reference portion 8a so as to fit the return reference portion 8a due to the return biasing force of the return spring 6 at all times.

FIG. 3 illustrates the shape of the cam surface 8 obtained by cutting the return cam member 7 by a plane parallel to an X-Y plane at the position of the return reference portion 8a. The cam surface 8 has a neutral return portion 8c formed therein in the middle thereof in the X direction. In addition, the cam surface 8 includes return inclined portions 8d and 8d on either side of the neutral return portion 8c in the $\beta$ direction. A temporary fixing portion 8e is formed on a $\beta$1 side of the return inclined portion 8d on the $\beta$1 side. In addition, a temporary fixing portion 8f is formed on a $\beta$2 side of the return inclined portion 8d located on the $\beta$side. Each of the two temporary fixing portions 8e and 8f is formed so as to have a concave shape.

The return biasing mechanism is formed by the neutral return portion 8c, the return inclined portions 8d and 8d, the return pin 5, and the return spring 6. The return biasing mechanism urges the control lever 3 towards the neutral position (the neutral position at which the rotation reference line O2 is directed in the Y direction) so that the top end sliding portion 5a of the return pin 5 fits the neutral return portion 8c.

The temporary fixing mechanism is formed by the temporary fixing portions 8e and 8f, the return pin 5, and the return spring 6. By using the temporary fixing mechanism, the control lever 3 is temporarily fixed in the operating position in which the top end sliding portion 5a of the return pin 5 fits one of the temporary fixing portions 8e and 8f. In FIG. 3, the return pin 5 is indicated by a dashed line when the control lever 3 and the rotation member 4 rotate in a $\beta$1 direction. At that time, the top end sliding portion 5a of the return pin 5 fits the temporary fixing portion 8e. That is, the control lever 3 reaches a first operating position and is temporarily fixed.

In contrast, if the control lever 3 is rotated from the neutral position in a $\beta$2 direction, the top end sliding portion 5a of the return pin 5 fits the temporary fixing portion 8f. That is, the control lever 3 reaches a second operating position and is temporarily fixed.

A cancelling drive member 10 is disposed above the rotation member 4. As illustrated in FIGS. 1 and 2, the cancelling drive member 10 includes a main body 11. A support shaft 12 is formed on top of the main body 11 in an integrated manner. As illustrated in FIGS. 1 and 2, a ceiling portion of the upper chassis 2 has a fixing side guide 2b formed therein. The fixing side guide 2b linearly extends in a Y1-Y2 direction. The support shaft 12 is slidably and rotatably supported by the fixing side guide 2b. A center line O3 of the support shaft 12 serves as a movement reference line for moving the cancelling drive member 10 forward and rearward (in the Y1-Y2 direction). In addition, the center line O3 serves as a rotation axis when the cancelling drive member 10 is rotated in an X-Y plane.

The top end of the main body 11 facing forward (in the Y1 direction) serves as a protruding portion 18. As illustrated in FIG. 1, a protrusion port 2c is open in the front portion of the upper chassis 2. If the cancelling drive member 10 is led by the fixing side guide 2b to move forward (in the Y1 direction), the protruding portion 18 protrudes forward from the front portion of the upper chassis 2 through the protrusion port 2c.

As illustrated in FIG. 1, a driven portion 13 is formed on the lower surface of the main body 11 of the cancelling drive member 10 in an integrated manner so that the driven portion 13 facing downward.

As illustrated in FIGS. 1 and 2, let H be the thickness of the main body 11 other than the support shaft 12 and the driven portion 13 in the vertical direction. As illustrated in FIG. 1, a groove 14 is formed so as to be open rearward (in the Y2 direction) in the middle of the main body 11 in the thickness direction of the main body 11. The main body 11 is formed by a cancel cam portion 15 located below the groove 14 and an upper body portion 16 located above the groove 14. A biasing cam portion 17 is formed inside of the groove 14 so as to continuously extend from the bottom surface of the upper body portion 16.

Figure 8:
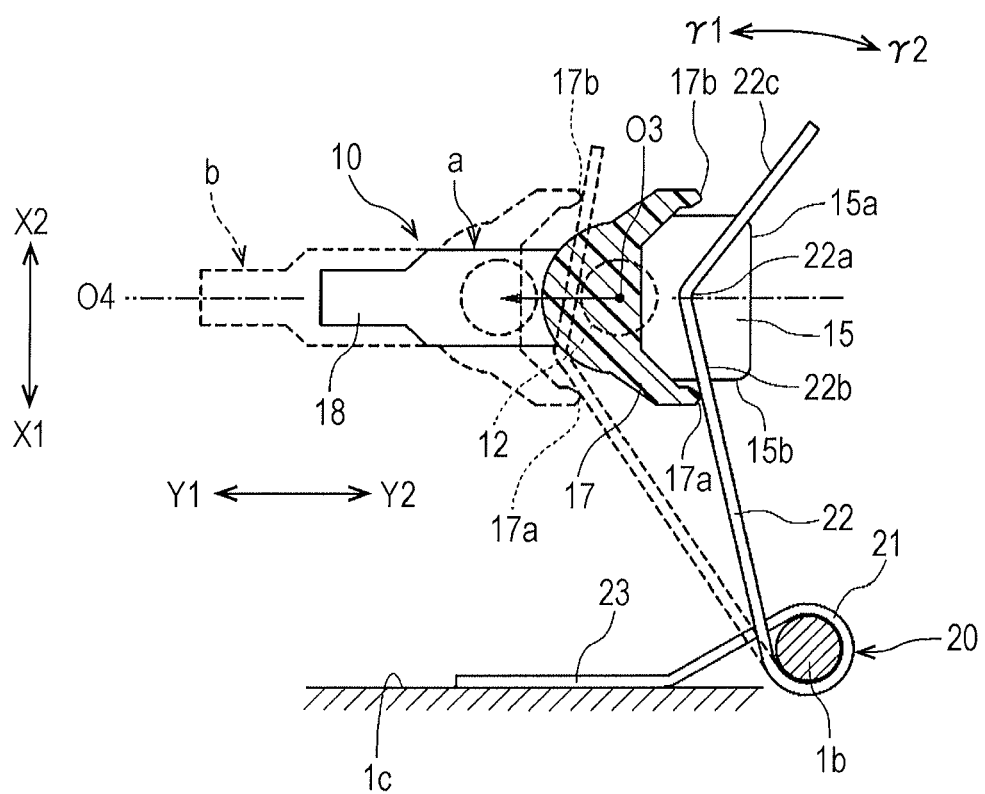
FIG. 8 is a plan view illustrating the operation performed when a cancelling drive member is urged by a deflectable spring member in the protruding direction.
Figure 9:
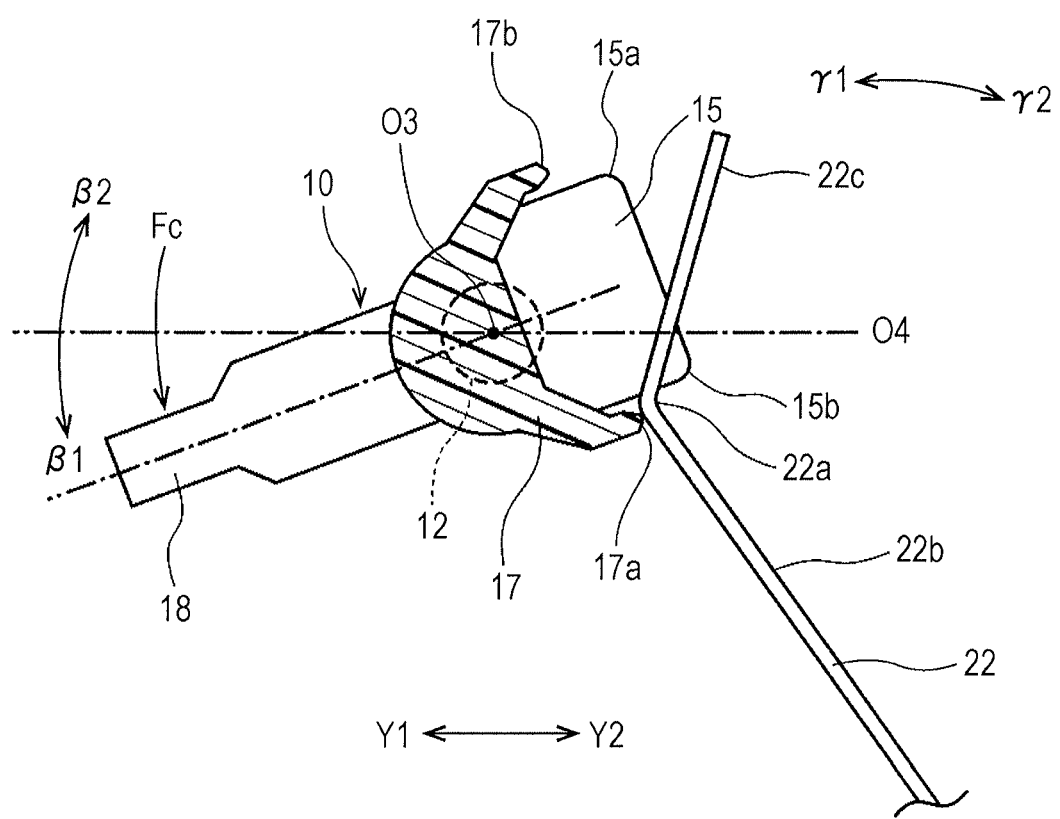
FIG. 9 is a plan view illustrating the operation performed when the cancelling drive member is returned to the rotational neutral position by the deflectable spring member.

FIGS. 8 and 9 are cross-sectional views of the cancelling drive member 10 cut by a plane parallel to the X-Y plane that passes through the inside of the groove 14.

A corner of the cancel cam portion 15 of the cancelling drive member 10 that is located on the rear (on the Y2 side) and on the X2 side serves as a first pressing portion 15a, and a corner on the rear and X1 side serves as a second pressing portion 15b.

FIG. 8 illustrates a protruding movement reference line O4 along which the center line O3 of the support shaft 12 of the cancelling drive member 10 linearly moves along the fixing side guide 2b in the front-rear direction (in the Y1-Y2 direction). As illustrated in FIG. 8, when the protruding portion 18 of the main body 11 is disposed so as to be parallel to the protruding movement reference line O4, the first pressing portion 15a and the second pressing portion 15b are located on either side of and are of equal distance from the protruding movement reference line O4 in the X direction. That is, the first pressing portion 15a is located on the X1 side of the center line O3, and the second pressing portion 15b is located on the X2 side of the center line O3 in the direction in which the cancelling drive member 10 moves.

As illustrated in FIGS. 8 and 9, in the biasing cam portion 17 formed inside the groove 14, a first biasing contact portion 17a that protrudes rearward (in the Y2 direction) on the X1 side and a second biasing contact portion 17b that protrudes rearward on the X2 side are formed.

As illustrated in FIG. 8, when the protruding portion 18 of the main body 11 is disposed so as to be parallel to the protruding movement reference line O4, the first biasing contact portion 17a and the second biasing contact portion 17b are located on either side of and are of equal distance from the protruding movement reference line O4 in the X direction. That is, the first biasing contact portion 17a is located on the X1 side of the center line O3, and the second biasing contact portion 17b is located on the X2 side of the center line O3 in the direction in which the cancelling drive member 10 moves.

As illustrated in FIG. 8, the lower portion of the lower chassis 1 contains a torsion spring 20. A winding portion 21 of the torsion spring 20 is wound around a fixed protrusion 1b provided on the lower chassis 1 serving as a fixed portion. One of elastic wires extending from the winding portion 21 of the torsion spring 20 serves as a deflectable spring member 22. The other elastic wire extending from the winding portion 21 is an elastic wire 23, which is in pressure contact with an inner wall 1c of the lower chassis 1.

The deflectable spring member 22 extends in the X-Y plane. That is, the deflectable spring member 22 extends through the groove 14 of the cancelling drive member 10 and further extends in a plane that is perpendicular to the rotation axis O1 and the center line O3.

The deflectable spring member 22 in a free state is significantly inclined in a γ1 direction illustrated in FIGS. 8 and 9. If deflection (bending deformation) is given to the deflectable spring member 22 in a γ2 direction, the elastic rebound force is generated in the γ1 direction.

A free end portion of the deflectable spring member 22 is placed in the groove 14 of the cancelling drive member 10. As illustrated in FIGS. 8 and 9, the free end portion of the deflectable spring member 22 has a bent portion 22a. The deflectable spring member 22 includes an elastic pressure portion 22b on the base-portion side of the bent portion 22a and an elastic pressure portion 22c on the top-end portion side of the bent portion 22a. The elastic pressure portion 22b on the base-portion side extends from the bent portion 22a diagonally rearward (in the Y2 direction) and in the X1 direction. The elastic pressure portion 22c on the top-end portion side extends from the bent portion 22a diagonally rearward (in the Y2 direction) and in the X2 direction.

The deflectable spring member 22 is in contact with at least one of the first biasing contact portion 17a and the second biasing contact portion 17b of the cancelling drive member 10. As illustrated in FIG. 8, the cancelling drive member 10 is urged by the deflectable spring member 22 in the protruding direction (in the Y1 direction).

In FIG. 8, the cancelling drive member 10 that is moved rearward (in the Y2 direction) and stays at a retreat position "a" is shown as a solid line, and the cancelling drive member 10 that is moved forward (in the Y1 direction) and stays at a protruding position "b" is indicated by a dashed line. If the cancelling drive member 10 is moved to the protruding position "b", the protruding portion 18 of the cancelling drive member 10 significantly protrudes forward (in the Y1 direction) from the upper chassis 2.

As illustrated in FIG. 8, if the cancelling drive member 10 is moved to the protruding position "b", the elastic pressure portion 22b of the deflectable spring member 22 on the base-portion side is brought into contact with the first biasing contact portion 17a. In addition, the elastic pressure portion 22c on the top-end portion side is brought into contact with the second biasing contact portion 17b. Since both the first biasing contact portion 17a and the second biasing contact portion 17b receive an elastic pressing force from the deflectable spring member 22, the cancelling drive member 10 located at the protruding position "b" enters a stable state so that the protruding portion 18 extends parallel to the protruding movement reference line O4.

FIG. 9 illustrates the cancelling drive member 10 that reaches the protruding position "b" and is rotated in the β1 direction by a cancelling force Fc. At that time, only the first biasing contact portion 17a is in contact with the elastic pressure portion 22b of the deflectable spring member 22 on the base-portion side. Thus, the first biasing contact portion 17a receives a rotational biasing force that moves back the cancelling drive member 10 to the original position in the β2 direction. In contrast, if the cancelling drive member 10 located at the protruding position "b" is rotated in the β2 direction, the second biasing contact portion 17b is brought into contact with the elastic pressure portion 22c of the deflectable spring member 22 on the top-end portion side and, thus, the cancelling drive member 10 receives a rotational biasing force in the β1 direction.

The cancelling drive member 10 includes the first biasing contact portion 17a and the second biasing contact portion 17b on either side of the center line O3 in the rotation direction. The first biasing contact portion 17a and the second biasing contact portion 17b are separated from each other by a predetermined distance. If the cancelling drive member 10 is moved to the protruding position "b", both the first biasing contact portion 17a and the second biasing contact portion 17b receive an elastic force from the deflectable spring member 22 and, thus, the position of the cancelling drive member 10 is made stable. In addition, when the cancelling drive member 10 is rotated, only one of the first biasing contact portion 17a and the second biasing contact portion 17b is pressed by the deflectable spring member 22. Accordingly, the cancelling drive member 10 can reliably return back to the neutral position in the rotation direction.

While the present exemplary embodiment has been described with reference to the deflectable spring member 22 formed from one of the elastic wires of the torsion spring 20, the base portion of a wire spring may be fixed to the inside of the lower chassis 1 and part of the wire spring may be used as the deflectable spring member. Alternatively, a leaf spring having a narrow width and extending in the X-Y plane may be prepared, the bent portion 22a and the elastic pressure portions 22b and 22c may be formed in the leaf spring, and the leaf spring may be used as the deflectable spring member.

In the vehicle operating device, the deflectable spring member 22 extends in a plane that passes through the inside of the groove 14 of the cancelling drive member 10. The plane is located in the middle of the height H of the main body 11 of the cancelling drive member 10. Accordingly, a space dedicated to only a spring member in the height direction is not required. As a result, the vehicle operating device can be made low-profile.

As illustrated in FIGS. 1 and 2, a concave portion 25 is formed in the front portion (on the Y1 side) of an upper surface 4c of the rotation member 4. In the concave portion 25, an advance/retreat control cam 26 is formed so as to protrude upward. The advance/retreat control cam 26 is substantially triangular in shape. A retreat regulating portion 26a is formed at a vertex of the triangle facing rearward (in the Y2 direction). At either end of the retreat regulating portion 26a in the X direction, guide inclined portions 26b and 26c are formed.

Figure 4:
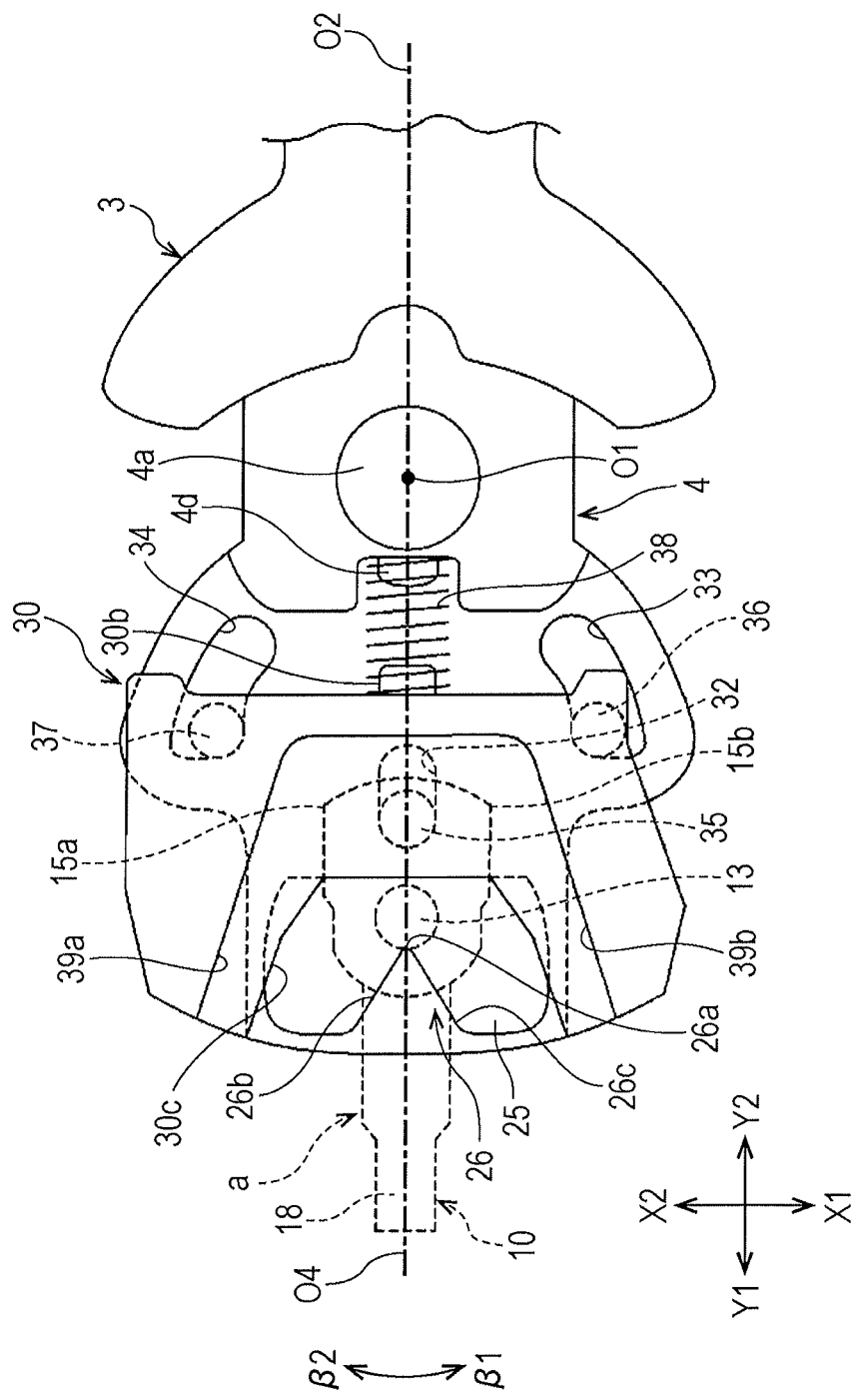
FIG. 4 is a plan view illustrating the operation performed by a control lever located at a neutral position.

As illustrated in FIG. 4, when the control lever 3 is at the neutral position and if the rotation reference line O2 is turned in the front-rear direction (in the Y direction), the driven portion 13 formed in the lower portion of the cancelling drive member 10 is retreated to a position at which the driven portion 13 is brought into contact with the retreat regulating portion 26a of the advance/retreat control cam 26. The cancelling drive member 10 is held at the retreat position "a".

Figure 5:
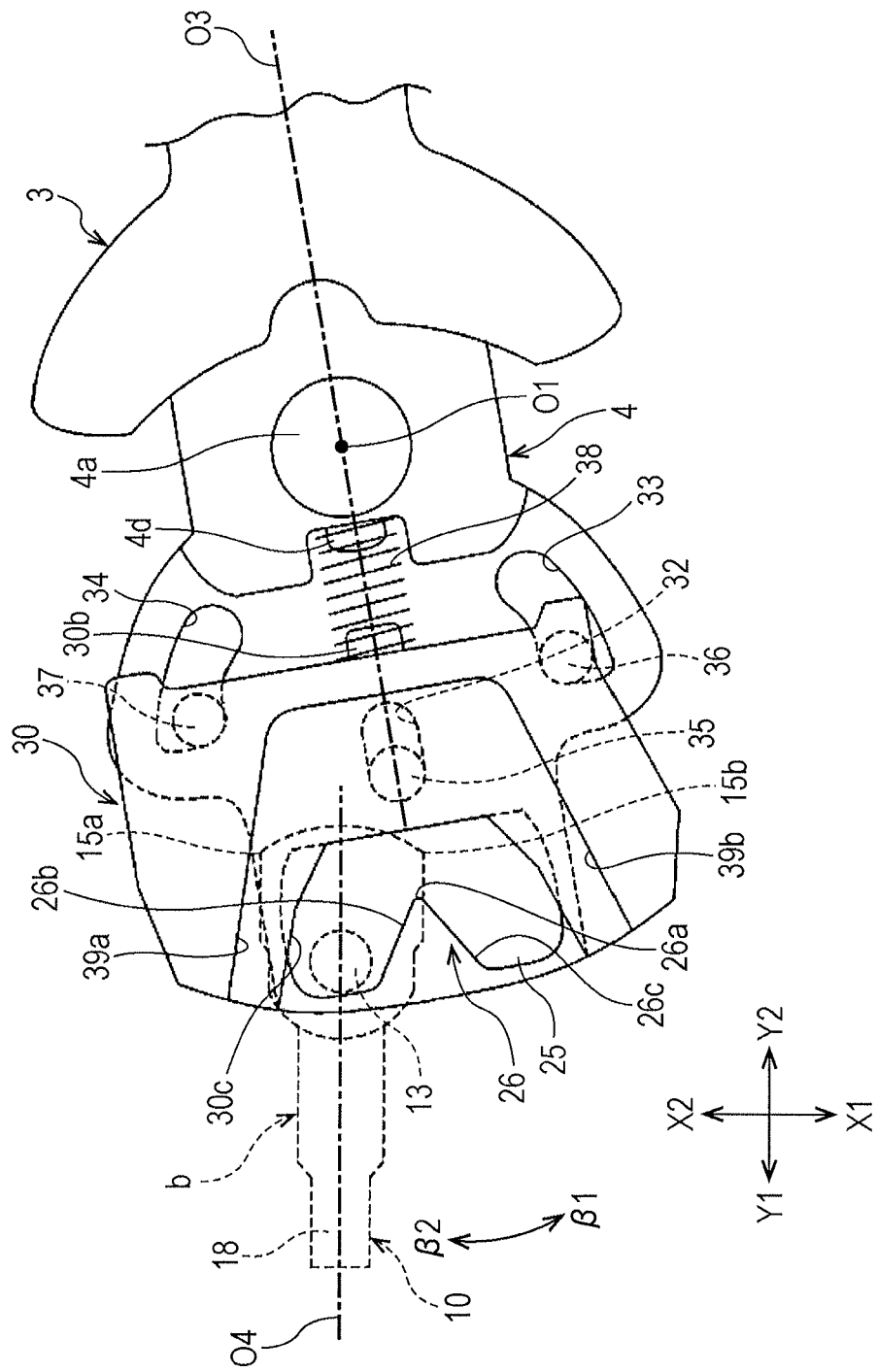
FIG. 5 is a plan view illustrating the operation performed by the control lever when the control lever is temporarily fixed at an operating position.

As illustrated in FIG. 5, if the control lever 3 is rotated in the β1 direction and is temporarily fixed at the first operating position, the driven portion 13 of the cancelling drive member 10 that is pressed by the deflectable spring member 22 slides forward on the guide inclined portion 26b of the advance/retreat control cam 26 and, thus, the cancelling drive member 10 is moved to the protruding position "b". In contrast, if the control lever 3 is rotated from the neutral position to the second operating position in the β2 direction, the driven portion 13 is led forward by the guide inclined portion 26c of the advance/retreat control cam 26 and, thus, the cancelling drive member 10 is moved to the protruding position "b".

The vehicle operating device has a structure so that the retreat regulating portion 26a of the advance/retreat control cam 26 disposed in the upper surface 4c of the rotation member 4 is directed rearward (in the Y2 direction), and the driven portion 13 formed on the lower portion of the cancelling drive member 10 is brought into contact with the advance/retreat control cam 26 in the rear portion in which the rotation axis O1 is located. Accordingly, a dedicated space for operating the cancelling drive member 10 is not necessary in the front portion of the rotation member 4 (in the Y1 direction). As a result, the length of the vehicle operating device in the front-rear direction (in the Y1-Y2 direction) can be reduced and, thus, a compact vehicle operating device can be easily provided.

Unlike the present exemplary embodiment, the advance/retreat control cam 26 may be formed on the lower surface of the cancelling drive member 10. The retreat regulating portion 26a of the advance/retreat control cam 26 may be directed forward (in the Y1 direction), and the driven portion 13 that allows the advance/retreat control cam 26 to slide may be provided on the upper surface of the rotation member 4.

As illustrated in FIGS. 1 and 2, an intermediate member 30 is provided in the upper section of the rotation member 4. The intermediate member 30 transfers the rotational force of the cancelling drive member 10 to the rotation member 4 and the control lever 3.

The intermediate member 30 includes four slide protrusions 31 that protrude upward. A lower surface 30a of the intermediate member 30 is in contact with the upper surface 4c of the rotation member 4. The four slide protrusions 31 are in contact with a slide surface formed inside the upper chassis 2. Thus, the intermediate member 30 is supported in a movable manner along the X-Y plane in the upper surface 4c of the rotation member 4.

As illustrated in FIG. 2, three slide cams 32, 33, and 34 are formed in the upper surface 4c of the rotation member 4. The slide cams 32, 33, and 34 are bottomed grooved cams or slit cams that pass through the upper surface 4c in the vertical direction (in the Z direction). The first slide cam 32 is a linear cam that linearly extends in the front-rear direction (the Y1-Y2 direction). As illustrated in FIG. 4, the second slide cam 33 and the third slide cam 34 are curved cams and are concave toward the first slide cam 32.

As illustrated in FIGS. 2 and 4, the intermediate member 30 has three slide protrusions 35, 36, and 37 integrated therewith. The slide protrusions 35, 36, and 37 protrude downward. The first slide protrusion 35 is inserted into the first slide cam 32. The second slide protrusion 36 is inserted into the second slide cam 33. The third slide protrusion 37 is inserted into the third slide cam 34.

The three slide cams 32, 33, and 34 and the three slide protrusions 35, 36, and 37 form a transfer guide unit. Note that in the transfer guide unit, the slide cams 32, 33, and 34 may be formed in the intermediate member 30, and the slide protrusions 35, 36, and 37 may be formed on the rotation member 4.

As illustrated in FIGS. 2 and 4, the intermediate member 30 has a spring support protrusion 30b integrated therewith. The spring support protrusion 30b protrudes rearward. The upper rear section of the rotation member 4 has a spring support protrusion 4d formed therein, the spring support protrusion 4d protrudes forward (in the Y1 direction). An elastic member 38 formed as a helical compression spring is disposed between the intermediate member 30 and the rotation member 4. The intermediate member 30 is urged forward (in the Y1 direction) by the elastic force of the elastic member 38 at all times.

As illustrated in FIGS. 2 and 4, the intermediate member 30 has a concave portion 30c formed therein. The concave portion 30c faces forward (in the Y1 direction). The driven portion 13 provided beneath the cancelling drive member 10 can move inside the concave portion 30c. In addition, the intermediate member 30 has a first transfer cam 39a and a second transfer cam 39b, which are stepped surfaces that extend in the vertical direction (the Z direction). The first transfer cam 39a and the second transfer cam 39b are inclined so that the distance therebetween increases rearward (in the Y2 direction).

The operation performed by the vehicle operating device is described next. In FIG. 4, the control lever 3 is at the neutral position. As illustrated in FIG. 1, at the neutral position, if the cam surface 8 is viewed in a cross-sectional view obtained by cutting the return cam member 7 by a plane parallel to the Y-Z plane, the top end sliding portion 5a is fitted into the return reference portion 8a. In the following operation, the control lever 3 is rotated in only the β direction and, thus, an operational force in the α direction does not act on the control lever 3. Accordingly, the top end sliding portion 5a fitted into the return reference portion 8a moves in the β direction along the cam surface 8 illustrated in the cross-sectional view of FIG. 3.

As illustrated in FIG. 4, at the neutral position, the rotation reference line O2 that extends through the shaft axis of the return pin 5 is directed in the front-rear direction (the Y direction). As shown as a solid line illustrated in FIG. 3, the top end sliding portion 5a of the return pin 5 is fitted into the neutral return portion 8c of the cam surface 8 of the return cam member 7.

As illustrated in FIG. 4, when the control lever 3 is at the neutral position, the rotation member 4 is also positioned so as to be parallel to the Y1-Y2 direction. Accordingly, the driven portion 13 is moved rearward (in the Y2 direction) by the advance/retreat control cam 26 formed on the upper surface 4c of the rotation member 4. Thus, the driven portion 13 is brought into contact with the retreat regulating portion 26a of the advance/retreat control cam 26, and the cancelling drive member 10 is held at the retreat position "a".

If a user wants to blink a left turn signal during a vehicle driving operation, the user rotates the control lever 3 in the β1 direction.

If the control lever 3 is rotated in the β1 direction, the top end sliding portion 5a of the return pin 5 slides on the return inclined portion 8d of the cam surface 8 and is fitted into the temporary fixing portion 8e, as indicated by the dashed line in FIG. 3. The control lever 3 is temporarily fixed at the first operating position at which the rotation reference line O2 is rotated in the β1 direction. If the control lever 3 is temporarily fixed at the first operating position, an electrical switch (not illustrated) is activated and, thus, the left turn signal blinks.

As illustrated in FIG. 5, if the control lever 3 is temporarily fixed at the first operating position, the advance/retreat control cam 26 formed in the rotation member 4 that rotates in the β1 direction together with the control lever 3 is deviated from the protruding movement reference line O4 extending in the front-rear direction of the cancelling drive member 10. Since the cancelling drive member 10 is urged forward (in the Y1 direction) by the deflectable spring member 22, the driven portion 13 slides forward (in the Y1 direction) on the guide inclined portion 26b of the advance/retreat control cam 26 with the rotation of the rotation member 4 in the β1 direction. Thus, the cancelling drive member 10 moves forward (in the Y1 direction) and is set at the protruding position "b".

As indicated by a dashed line in FIG. 8, if the cancelling drive member 10 moves to the protruding position "b", the elastic pressure portion 22b of the deflectable spring member 22 on the base-portion side presses the first biasing contact portion 17a, and the elastic pressure portion 22c on the top-end portion side presses the second biasing contact portion 17b. Thus, the cancelling drive member 10 is set at a stable position without rotating and with the protruding portion 18 extending parallel to the protruding movement reference line O4.

Figure 6:
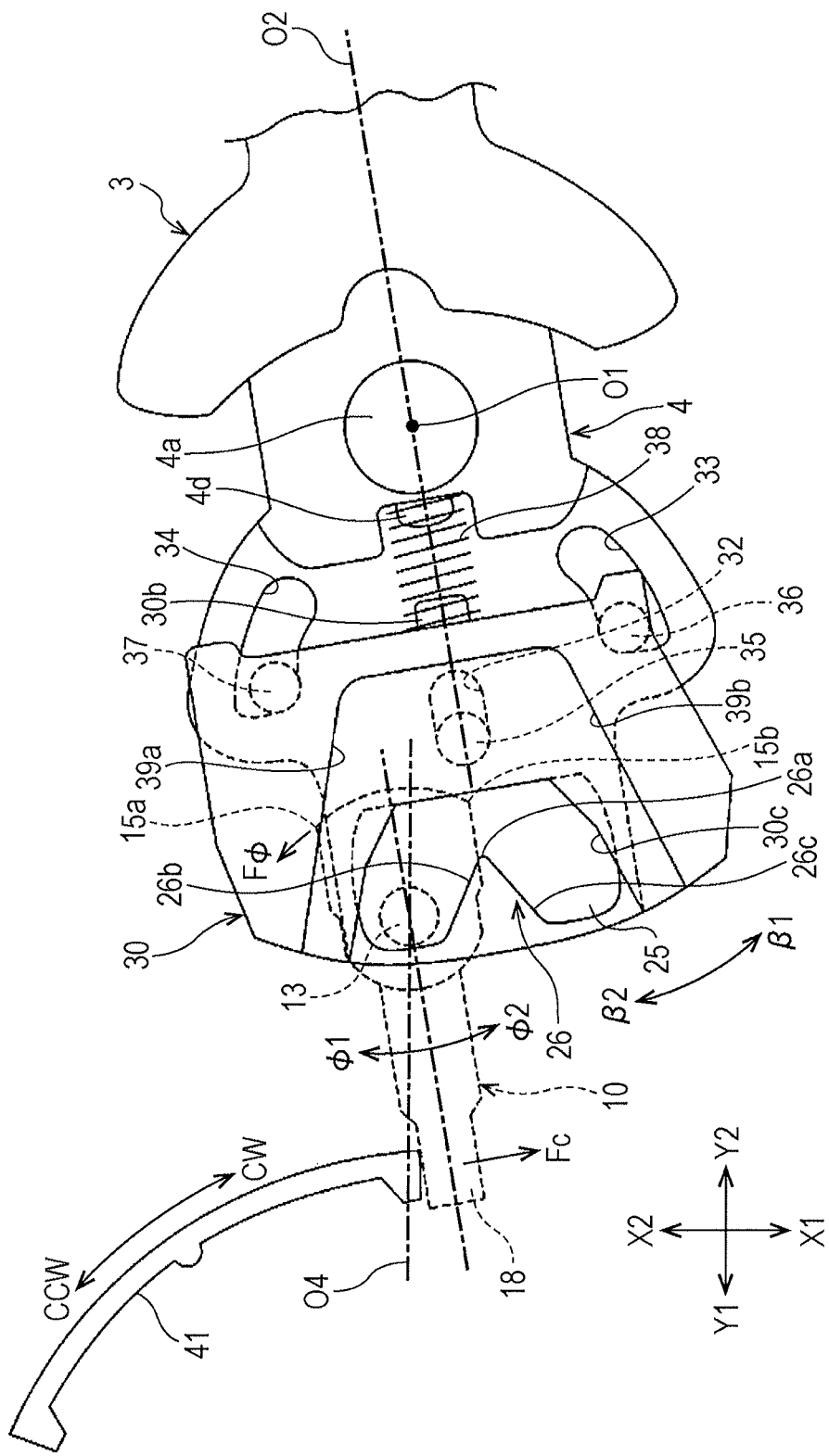
FIG. 6 is a plan view illustrating the operation performed by the control lever when the control lever is moved back from the operating position to the neutral position.

If the cancelling drive member 10 reaches the protruding position "b", the protruding portion 18 of the cancelling drive member 10 significantly protrudes forward from the upper chassis 2. Thus, as illustrated in FIG. 6, the protruding portion 18 of the cancelling drive member 10 is located inside of the moving area of a forcing member 41 that rotates together with a steering shaft.

When, to blink the left turn signal, the control lever 3 is rotated in the β1 direction and is temporarily fixed at the first operating position and if the steering wheel is rotated in a left turn direction, the forcing member 41 is rotated together with the steering shaft in a counterclockwise (CCW) direction. The forcing member 41 that rotates in the counterclockwise direction is brought into contact with the protruding portion 18 of the cancelling drive member 10 located at the protruding position "b". Thus, the cancelling drive member 10 is rotated in a Φ1 direction illustrated in FIG. 6. Even when the cancelling drive member 10 is rotated in the Φ1 direction, a rotational force is not exerted on the intermediate member 30 by the cancelling drive member 10, since the first pressing portion 15a is simply separated from the first transfer cam 39a of the intermediate member 30.

That is, when the forcing member 41 rotates in the counterclockwise (CCW) direction, the cancelling drive member 10 simply spins free in the Φ1 direction. Thus, the moving force of the forcing member 41 does not act on the intermediate member 30, the rotation member 4, and the control lever 3.

If the steering wheel that is rotated in the left turn direction is moved back to the original position in the clockwise direction, the forcing member 41 is rotated in the clockwise (CW) direction together with the steering shaft. As illustrated in FIG. 6, if the forcing member 41 that is rotated in the clockwise direction is brought into contact with the protruding portion 18 of the cancelling drive member 10 located at the protruding position "b", the cancelling force Fc that attempts to rotate the cancelling drive member 10 in a Φ2 direction is generated. Thus, a rotational force FΦ is exerted on the first transfer cam 39a of the intermediate member 30 by the first pressing portion 15a of the cancelling drive member 10 that tends to rotate in the Φ2 direction.

As illustrated in FIG. 6, the intermediate member 30 is urged forward by the elastic member 38, which is a helical compression spring, with a relatively strong force and, thus, the first slide protrusion 35 is pressed against the front end portion of the first slide cam 32 provided in the rotation member 4. In addition, the second slide protrusion 36 and the third slide protrusion 37 are also pressed against the front end portions of the second slide cam 33 and the third slide cam 34. Thus, the intermediate member 30 is set at the initial position with respect to the rotation member 4. Accordingly, the intermediate member 30, the rotation member 4, and the control lever 3 can operate in an integrated manner.

In this manner, if the rotational force FΦ is exerted on the first transfer cam 39a of the intermediate member 30 by the cancelling drive member 10, a force that tends to rotate the intermediate member 30 in the β2 direction together with the rotation member 4 and the control lever 3 is generated.

If the rotational force in the β2 direction is exerted on the intermediate member 30 and the control lever 3, the top end sliding portion 5a of the return pin 5 indicated by the dashed line in FIG. 3 comes off from the temporary fixing portion 8e. Thus, the top end sliding portion 5a subjected to a biasing force of the return spring 6 slides on the return inclined portion 8d and is led to the position at which the top end sliding portion 5a is fitted into the neutral return portion 8c. Due to the leading force, the control lever 3 is moved back to the neutral position illustrated in FIG. 4.

Figure 7:
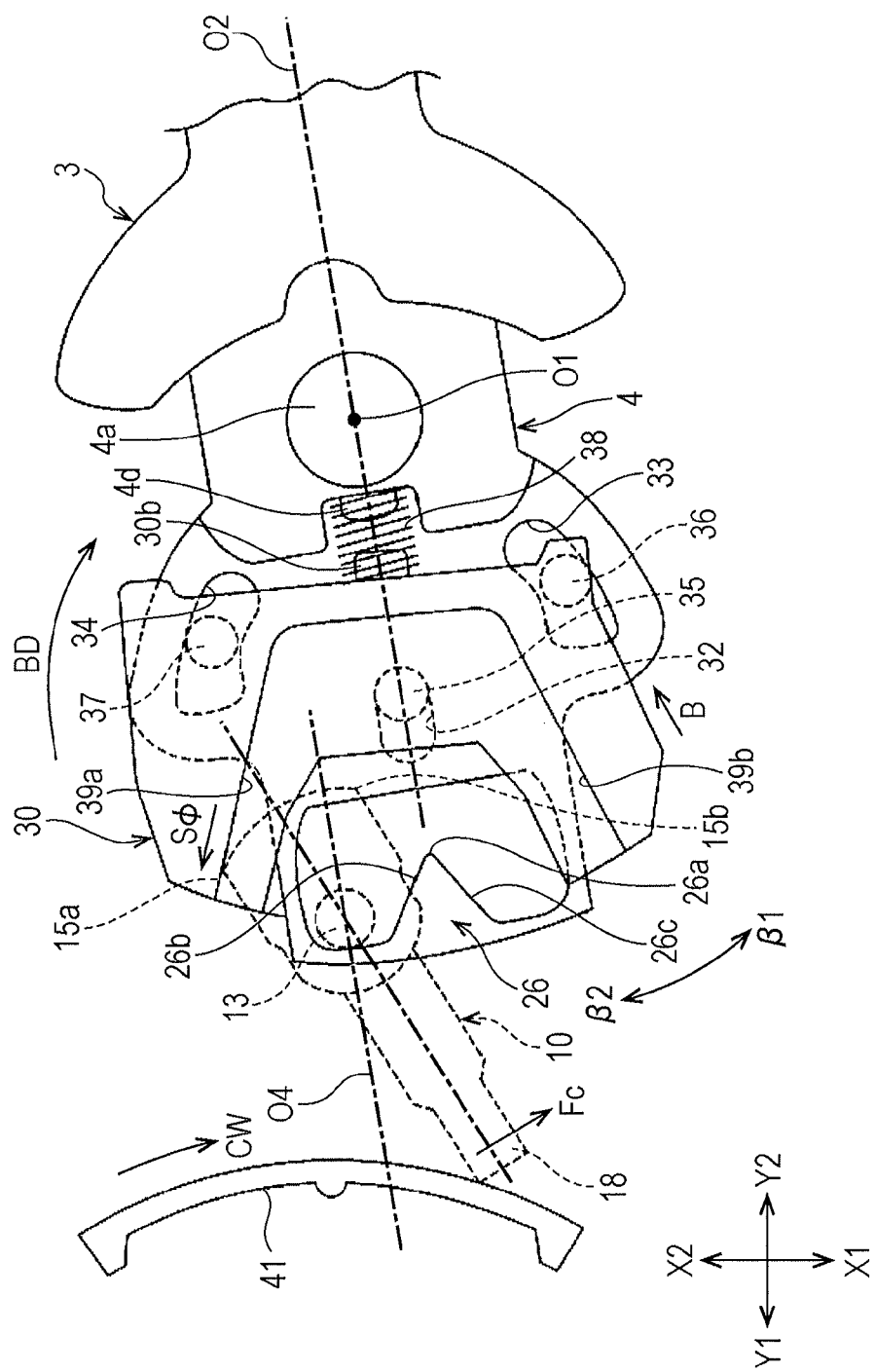
FIG. 7 is a plan view illustrating the operation performed by the control lever when the control lever is restrained at the operating position.

FIG. 7 illustrates an irregular operation in which third slide protrusion 37 move rearward inside the second slide cam 33 and the third slide cam 34. Thus, the intermediate member 30 rotates while retreating on the rotation member 4.

Since the intermediate member 30 retreats and rotates, rocking of the mechanism does not occur even when the cancelling drive member 10 is rotated by the forcing member 41 in the Φ2 direction, as illustrated in FIG. 7.

As illustrated in FIG. 7, since the intermediate member 30 retreats and rotates on the rotation member 4, the cancelling drive member 10 can be rotated with the rotation member 4 stopped and without giving a large internal stress to the cancelling drive member 10.

Note that if a restraint force exerted on the control lever 3 is released in the state illustrated in FIG. 7, a force that attempts to return the relative positional relationship between the intermediate member 30 and the rotation member 4 back to the initial positional relationship illustrated in FIG. 6 is generated by the elastic member 38. Thus, the control lever 3 is moved back to the neutral position.

As illustrated in FIG. 9, if the cancelling drive member 10 is rotated, the first biasing contact portion 17a is brought into contact with the elastic pressure portion 22b of the deflectable spring member 22. Accordingly, the rotational returning force is effectively applied to the cancelling drive member 10.

Note that the operations performed when the control when the control lever 3 that is rotated in the β1 direction and is temporarily fixed at the first operating position and, thereafter, the control lever 3 is intentionally restrained by, for example, the hand of the user, the steering wheel is rotated in the clockwise direction to the neutral position.

If, as illustrated in FIG. 6, the forcing member 41 is rotated in the clockwise (CW) direction with the control lever 3 temporarily fixed at the first operating position, the forcing member 41 is brought into contact with the protruding portion 18 of the cancelling drive member 10. Thus, the cancelling drive member 10 is rotated in the Φ2 direction. In this manner, the rotational force FΦ is exerted on the first transfer cam 39a of the intermediate member 30 by the first pressing portion 15a of the cancelling drive member 10.

At that time, if the control lever 3 is restrained by, for example, the hand of the user, the rotation member 4 cannot be rotated in the β2 direction together with the intermediate member 30. In such a case, as illustrated in FIGS. 6 and 7, the first pressing portion 15a of the cancelling drive member 10 that rotates in the Φ2 direction causes the first transfer cam 39a of the intermediate member 30 to slide in an SΦ direction. As illustrated in FIG. 7, a sliding reaction force generates a retreat force B and a rotational force BD in the clockwise direction acting on the intermediate member 30. Due to the forces, the first slide protrusion 35 moves to the rear end portion of the first slide cam 32, and the second slide protrusion 36 and the lever 3 is rotated from the neutral position in the β2 direction and is temporarily fixed at the second operating position are substantially the same as the above-described series of operations except that the rotational direction is reversed.

What is claimed is:

1. A vehicle operating device comprising:
  a control lever configured to rotate from a neutral position to an operating position;
  a rotation member configured to rotate together with the control lever;
  a return biasing mechanism configured to generate a biasing force to return the control lever to the neutral position;
  a temporary fixing mechanism configured to temporarily fix the control lever that is rotated to the operating position;
  a cancelling drive member configured to be movably led by a fixing side guide between a retreat position and a protruding position and rotate when moving to the protruding position and receiving a cancelling force from the outside;
  a deflectable spring member having a fixed base portion, the deflectable spring member extending in a plane that is perpendicular to a rotation shaft of the rotation member, the deflectable spring member urging the cancelling drive member toward the protruding position;
  an advance/retreat control cam provided in one of the rotation member and the cancelling drive member, the advance/retreat control cam moving the cancelling drive member to the retreat position when the control lever is located at the neutral position and moving the cancelling drive member to the protruding position when the control lever rotates to the operating position;
  an intermediate member configured to receive a rotational force generated when the cancelling drive member that has received the canceling force rotates;
  a transfer guide unit provided between the intermediate member and the rotation member, the transfer guide unit transferring the rotational force exerted on the intermediate member by the cancelling drive member to the control lever, the transfer guide unit moving the rotation member relative to the intermediate member when a rotational force is exerted on the intermediate member by the cancelling drive member with the control lever restrained; and
  an elastic member provided between the intermediate member and the rotation member, the elastic member urging the intermediate member toward an initial position at which position the rotational force is transferred to the rotation member.

2. The vehicle operating device according to claim 1, wherein the cancelling drive member includes a biasing contact portion for receiving an elastic pressing force of the deflectable spring member, and rotation axes of the biasing contact portion and the cancelling drive member are disposed with a space therebetween in a direction that intersects a direction in which the cancelling drive member moves and protrudes.

3. The vehicle operating device according to claim 2, wherein the control lever is set at one of two operating positions that are located on the opposite sides of the neutral position in a rotational direction, and the control lever is temporarily fixed at the operating position by the temporary fixing mechanism,
  wherein the cancelling drive member is set so as to receive a canceling force in each of both the directions from the outside, and
  wherein the biasing contact portion is located on both sides of the rotation axis of the cancelling drive member, a bent portion is formed in the free end portion of the deflectable spring, and each of portions on both sides of the bent portion is capable of being in contact with the biasing contact portion.

4. The vehicle operating device according to claim 2, wherein the cancelling drive member has a groove formed therein in the middle of a thickness direction that is perpendicular to the plane, and the deflectable spring member enters the inside of the groove and is in contact with the biasing contact portion.

5. The vehicle operating device according to claim 1, wherein the advance/retreat control cam is formed in the rotation member and has a shape of a protrusion protruding toward the rotation shaft, and a driven portion provided in the cancelling drive member is in contact with the advance/retreat control cam from the rotation shaft side.

6. The vehicle operating device according to claim 1, wherein in the transfer guide unit, a slide protrusion is formed on one of the rotation member and the intermediate member, a slide cam is formed on the other, and the slide protrusion is slidably led by the slide cam, wherein the intermediate member in an initial state in which the intermediate member does not receive a rotational force from the cancelling drive member is urged in a protruding direction of the cancelling drive member by the biasing force of the elastic member, and the intermediate member and the rotation member are rotatable together by the rotational force exerted on the intermediate member, and wherein if the rotational force is exerted on the intermediate member by the cancelling drive member with the control lever restrained, the slide protrusion slides on the slide cam and, thus, the intermediate member rotates in a direction opposite to the protruding direction, and the intermediate member is retreated.

* * * * *